United States Patent [19]

White

[11] Patent Number: 5,084,521
[45] Date of Patent: Jan. 28, 1992

[54] LIQUID SPRAYABLE EPOXY COMPOSITION AND METHOD

[75] Inventor: Roosevelt White, Detroit, Mich.

[73] Assignee: Ziebart International Corporation, Troy, Mich.

[21] Appl. No.: 464,914

[22] Filed: Jan. 16, 1990

[51] Int. Cl.$^5$ .............. C08L 63/02; C08L 63/04; C08K 3/40; C08K 5/17

[52] U.S. Cl. ................ 523/436; 523/438; 523/444; 523/445; 523/457; 523/458; 523/466; 523/468

[58] Field of Search ............ 523/436, 438, 444, 445, 523/457, 458, 466, 468

[56] References Cited

U.S. PATENT DOCUMENTS

| | | | |
|---|---|---|---|
| 3,285,522 | 11/1966 | Salisbury | 239/429 |
| 3,316,195 | 4/1967 | Grosner et al. | 523/444 |
| 3,844,030 | 10/1974 | Wilkinson | 264/135 |
| 3,892,883 | 7/1975 | Leclercq | 427/34 |
| 3,917,790 | 11/1975 | Oswitch et al. | 264/267 |
| 4,077,921 | 3/1978 | Sharpe et al. | 260/2.5 B |
| 4,242,406 | 12/1980 | El Bouhnini et al. | 428/236 |
| 4,243,706 | 1/1981 | Williams | 523/459 |
| 4,263,352 | 4/1981 | Kaltenbach et al. | 427/379 |
| 4,355,317 | 10/1982 | Muzio | 343/840 |
| 4,383,955 | 5/1983 | Rubio et al. | 264/46.6 |
| 4,500,660 | 2/1985 | Minamisawa et al. | 523/468 |
| 4,579,885 | 4/1986 | Domeier et al. | 523/445 |
| 4,608,404 | 8/1986 | Gardner et al. | 523/445 |
| 4,636,535 | 1/1987 | Wang et al. | 523/457 |
| 4,645,803 | 2/1987 | Kohli et al. | 523/445 |
| 4,739,895 | 4/1988 | Bachmann | 220/627 |
| 4,751,129 | 6/1988 | Ramalingam et al. | 428/195 |

FOREIGN PATENT DOCUMENTS

| | | | |
|---|---|---|---|
| 3641187 | 6/1988 | Fed. Rep. of Germany . | |
| 0213719 | 12/1984 | Japan | 523/444 |
| 61-22807 | 8/1986 | Japan . | |

OTHER PUBLICATIONS

Chemical Abstracts 109 (4) 24325e.
Chemical Abstracts 108 (26) 223178p.
Chemical Abstracts 107 (24) 227535e.
Chemical Abstracts 107 (20) 189113f.
Chemical Abstracts 106 (18) 143057s.
Chemical Abstracts 105 (14) 116113e.
Chemical Abstracts 104 (12) 90622x.
Chemical Abstracts 102 (24) 207988y.
Chemical Abstracts 102 (8) 63314a.
Chemical Abstracts 101 (18) 15296k.
Chemical Abstracts 88 (22) 154446d.
Applied Polymer Science, by J. Kenneth Craver, Chapter 52, Tech. Data Bulletin for Epi-Cure 879 of Hi-Tek Polymers.
Materials Technology, Aug. 1989, pp. 47-64.
Tech. Bulletin for CMD 50735 Epoxy Resin of Interex.
Tech. Bulletin for Kelpoxy G293-100, rev. Dec. 18, 1980.
Tech. Bulletin for Heloxy WC-8006.
Tech. Data Sheet for Ancamine 1895 of Pacific Anchor
Euredur Brochure for Hardeners for Epoxy Resins.
Tech. Data Sheet for Sylvamine 21.
Tech. Data Bulletin for Epi-Cure 8799 of Hi-Tek Polymers.
Ancamine K.54 Tech. Data Sheet.

*Primary Examiner*—Paul R. Michl
*Assistant Examiner*—Peter Szekely
*Attorney, Agent, or Firm*—Brooks & Kushman

[57] ABSTRACT

Described is a liquid sprayable epoxy composition comprising a liquid epoxy resin, an effective reinforcing amount of a fiber, an elastomeric component and an amine containing epoxy curing agent capable of curing the composition at equal or greater than 40° F. temperatures wherein the cured product is light stable and has a hardness on the Shore D scale. Further described is a method of forming in situ a cured product such as a truck bed liner by spraying, brushing or troweling the epoxy composition onto the substrate such as the trunk bed, curing and forming the product on the substrate at a temperature of at least 40° F. temperature. The ratio of epoxy reactive groups to amine reactive groups ranges from 0.9 to 1.1:1. Further described is a technique of modifying the coating coefficient of friction by sand embedment between the induction period and cure set time of applied epoxy composition.

21 Claims, 1 Drawing Sheet

LIQUID SPRAYABLE EPOXY COMPOSITION AND METHOD

BACKGROUND OF THE INVENTION

The present invention deals with a liquid sprayable epoxy composition. The invention is also concerned with a liquid epoxy composition that further contains an elastomeric component.

Molded truck bed liners have been utilized but are generally comprised of a variety of materials such as polyethylene or polypropylene or polyvinyl chloride. The liners are generally vacuum formed and are stored in inventory to fit a particular configuration of a truck bed so that it may be a drop-in liner. Such liners have become useful as a means of protecting the truck bed itself and to improve the appearance characteristics of the vehicle.

An inventory problem is present with the formed drop-in place truck bed liners, for a substantial amount of volumetric space must be kept for storage of such liners.

Liners in the past have been prepared by spraying a resinous material onto a fiberglass backing and, while the backing is in a shapable configuration, adjusting it by hand to the truck bed. Such liners have a tendency to crack upon exposure to severe cold temperatures thereby separating from the truck bed itself.

Other truck bed liners have been utilized that are not of a nature to have desirable toughness, impact strength and elasticity to withstand friction of goods that would need to be placed into and off of such liners. Drop in liners are plagued with problems of dirt, moisture and mudpacking between the truck bed itself and the liner that creates an environment for accelerated corrosion of the metal beneath the liner.

U.S. Pat. No. 4,751,129, Ramalingam et al., describes a one component composition for application to a substrate such as an automotive metal body panel to provide reinforcement thereto which contains a heat curable epoxy resin which has as a component thereof, a carboxy terminated elastomer, a curing agent such as dicyandiamide and a plurality of inorganic particulate filler materials. The epoxy resin contains both a liquid epoxy resin and a solid epoxy resin.

An object of the present invention is to employ a liquid sprayable epoxy composition which contains reinforcing amounts of a fibrous material as well as an elastomeric component which may be curable at room temperature as low as 40 F and is stable to the environment as well as having the ability to withstand the frictional requirements of a vehicle, e.g. truck bed liner, such as having a hardness on the Shore D scale. This composition resists "blushing", i.e. carbonation, and can be tailored to exhibit varying coefficients of friction.

SUMMARY OF THE INVENTION

Described is a liquid sprayable epoxy composition comprising:
 a liquid epoxy resin;
 an effective reinforcing amount of a fiber;
 an elastomeric component, and
 an amine containing epoxy curing agent capable of curing the composition at room temperature as low as 40° F. temperature wherein the cured product is light stable and has a hardness on the Shore D scale.

The liquid sprayable epoxy composition is preferably used to prepare in situ a cured product such as a truck bed liner by spraying the aforementioned epoxy composition onto the desired substrate, curing and forming the product on the substrate at a room temperature as low as 40° F. wherein the product has a hardness on the Shore D scale.

DESCRIPTION OF PREFERRED EMBODIMENTS

Figure 2:
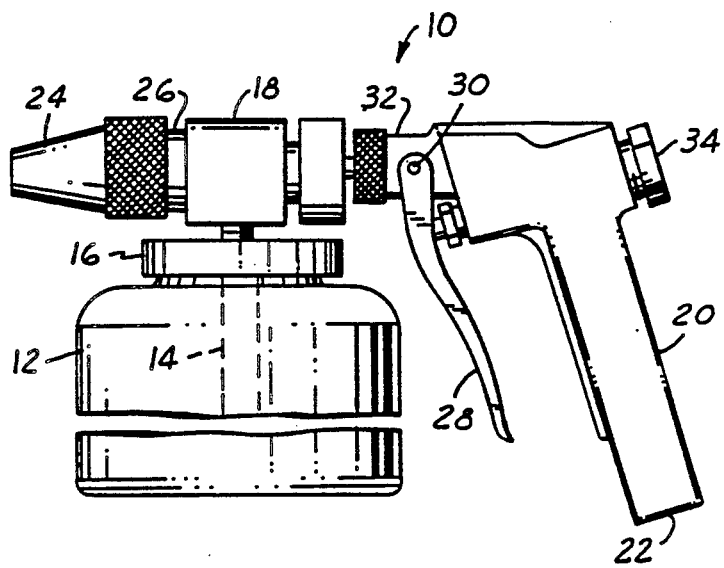
FIG. 2 is another spray gun from which the friction inducting particles are sprayed onto the applied coating composition of the present invention.

The liquid sprayable epoxy composition of the present invention is preferably used to prepare products in situ. For example, the finally cured epoxy product can be applied by spraying onto a substrate such as a truck bed. Other suitable formed substrates, whether they be metallic, wood, or plastic, could also be employed. The epoxy composition of the present invention forms cured products that are coextensive with the shape of the substrate. Therefore, any particular product could be formed depending upon the mold shape or the truck bed as desired. This epoxy composition can be custom color tinted in-situ to virtually any color.

This sprayable bedliner can be supplied to yield a variety of textures dependent upon customer needs. The texture is controlled by length and diameter of fibers used in the formula. This epoxy composition can be modified to exhibit varying coefficients of friction and increased tensile strength when cured by embedment of sand or variations thereof at a time interval between the induction period and cure set.

The finally cured product is one that has a substantial thickness ranging from about 0.01 centimeters to about 1 centimeter, preferably 0.03 to 0.3 centimeters.

The coating composition of the present case is preferably one that is a liquid epoxy composition. A wide variety of liquid epoxy materials can be employed as long as they can be sprayable. The epoxy resins can be glycidated resins, cycloaliphatic epoxy resins, epoxidized oils and the like. Frequently, the glycidated resins are reaction products of glycidyl ether and bisphenol material such as BPA (bisphenol acetone reaction product) or BPF (bisphenol formaldehyde reaction product) and epichlorohydrin. Other epoxy materials are epoxidized polyalkylene glycol derivatives. The epoxy material may also be derived from phthalic acid, diglycidyl ester, dicyclopentadiene diepoxide, and the like.

Another useful class of polyepoxide materials are those that can be prepared from Novolak resins or similar polyphenol resins.

A class of polyepoxides that may likewise be employed is acrylic polymers containing epoxy groups. Preferably, these acrylic polymers may be prepared by polymerizing glycidyl acrylate or methacrylate, a hydroxy containing unsaturated monomer and at least one other unsaturated monomer.

Typical epoxy resins are those having an epoxy equivalent of between about 100 and 800. It is preferred that the epoxy material be a liquid at room temperature. This can be accomplished by the epoxy being a liquid itself, or that it may be solubilized in a desirable solvent as described below. In some instances, the epoxy material may be particulate in nature as long as the particle size is not so large as to interfere with the desire for spraying the composition.

The elastomer component can be added to the composition either as a separate material or as a component or portion of the epoxy composition. Elastomers such as natural rubber, styrene butadiene, polybutadiene, polyisoprene, ethylene propylene, chloroprene, acrylonitrile-butadiene, ethylene-propylenediene monomer (EPDM), butyl rubber such as isopreneisobutylene and the like may also be used. A preferred material, however, is an epoxy that has contained therein the elastomeric component, that is, the elastomer segments are grafted onto the epoxide chain or groups. In other words, the epoxy and elastomer components are in a single resinous system or material. These resins are generally available from the trade such as Heloxy WC-8006 (trademark of Wilmington Chemical of Wilmington, Del. for a concentrated adduct of liquid epoxy resin and synthetic butadiene-acrylonitrile rubber containing 40% of the elastomer and having an epoxide equivalent weight of 335-385). Another resin is Kelpoxy G 293-100 (trademark of Spencer Kellogg Products of N.L. Industries for a concentrate of an epoxy terminated elastomeric copolymer which exhibits, in the cured state, elastomer particles of 0.01-10 microns in diameter which block the propagation of cracks and absorb strain energy). Kelpoxy G 293-100 has an acid value of 0.1 and an epoxide equivalent weight of 340. Alternatively, one may use an epoxy resin identified as CMD 50735 (trademark of Interez, Inc. for an epoxy resin having both epoxide groups and reactive unsaturation and having an epoxide equivalent weight of 220).

In order to obtain a room temperature curable coating composition, it is most desirable that the epoxy composition be a two component composition. By that it is meant that the epoxy resin is placed in one container and the curing agent is placed in a second container. The curing of the epoxide starts when the materials are blended just prior to the spraying process.

The curing agents that are employed in the present application are preferably aliphatic amines, cyclo aliphatic amines, Lewis base or Mannich base and the like era combination there of. It is most preferred that one of the crosslinking agents be a tertiary amine containing material.

The aliphatic amine may be alkylene diamines such as ethylene or propylene diamine, triethylene diamine, piperazine-n-ethylamine, polyoxyalkylene diamines such as polyoxyethylene diamine or polyoxypropylene diamine and the like. Cycloaliphatic amines may be used as hexahydro cyclohexane diamine, isopherone diamine and the like. Aromatic amines frequently are employed as a catalyst for the polymerization inducing cross-linking of the epoxy material itself by inducing reaction between the epoxy group or a reaction between the epoxide group and hydroxyl groups. Tertiary amines are preferably employed such as benzyldimethyl amine, Lewis acids and/or Mannich base such as boron trifluoride monoethyl amine or imidazoles and the like. Other tertiary amines may also be employed such as tris(dimethylaminomethyl)phenol and the like.

It is particularly important to obtain a quick curing process that results in a light stable material that does not blush or carbonate. By "blushing" it is meant that the cured epoxy resin turns white when exposed to the environment. While applicant does not wish to bound to any theory, it is believed that this whitening effect occurs by virtue of a degradation of the cured epoxy products and is an undesirable attribute.

Other materials may be added to the liquid coating composition such as fillers and pigments which can assist in increasing tensile strength, hardness and rigidity, decrease shrinkage, decrease coefficient of thermal expansion, increase thermal conductivity, reduce moisture penetration and decrease flow. Some fillers that may be employed are silicas, silicates, calcium carbonates, clays, iron oxides, aluminum oxides, portland cement and the like. Other pigments may be added for coloring purposes, hiding or rusting inhibition.

It is also desirable to employ a solvent to control the viscosity for the spraying purposes.

It is most desirable to control the ratio of the number of reactive epoxide groups with amine curing groups. That ratio may range from 0.9 to about 1.1 amine curing groups to epoxide groups, preferably 1 to 1, and even more preferably, a slight excess of curing groups.

The epoxy resin that is utilized in the total curing composition ranges from about 10 to about 80% by weight, preferably 20 to about 40% by weight. This is exclusive of non-reactive fillers with the exception of the fibrous material.

The fibrous material that is employed in the total coating composition ranges from about 1 to about 15% by weight, preferably 1 to about 5% by weight. The fibrous material may be natural, synthetic, mineral or polymer where the diameter is less than 10 microns, preferably 1 to about 5 microns, and even more preferably, 2-3 microns and will vary with the application of the coating composition. For a textured finish, a fiber length of 200 microns may be used. For a smooth finish, shorter lengths of 10-20 microns may be used. The fiber length for the truck bed liner generally is less than 100 microns, preferably more than 50, and even more preferably, about 70-80 microns. Fibers having a diameter greater than 10 microns and length greater than 100 microns may be used if a multi feed application system is employed to separately apply the fibers and the epoxy plus curing agent onto the substrate from a spray head (multi-nozzle) with the fiber exiting the middle port and the epoxy exiting the perimeter ports to effect an external (to spray tip) mixing of materials prior only to hitting the substrate.

Generally, the fiber is a vitreous alumino silicate fiber of a man-made type. It is also characterized as a refractory, Kaolin ceramic fiber. Suitable fibers are available from the trade as Fiber Frax HSA fiber (trademark of Carborundum Company, Niagara Falls, New York, for an alumino silicate fiber having a diameter of 1.2 microns and a fiber length of 3 millimeters). Fiberfrax EF121 may also be employed which has a fiber diameter of 2-3 microns with an average fiber length of approximately 70 microns.

On occasions, it may be desirable to have an accelerated cure of the coated composition. In that case, the composition can be subjected to temperature greater than 125° F., such as, ranging from about 125° F. to about 350° F., preferably about 200 to 220° F. Occasionally, it may be necessary to lengthen potlife without modifying the composition. This may be accomplished by pre-conditioning by refrigeration of each component to a predetermined temperature prior to mix for an application. Refrigeration of epoxy components and hardner prior to mixing for an application may also be employed to increase cure speed while extending potlife. The temperature conditioning technique will provide the flexibility of processing for plural component spray application for a product potlife of 5 minutes on material conditioned to 25° C. or processing via premix of refrigerated components prior to application to extend potlife to upwards of 3 hours for the same formula.

In many instances, it may be necessary to provide both skid and non-skid properties for the cured epoxy liner. For non-skid properties, silica sand or variations thereof in hardness, abrasiveness and color may be applied by spray or other means for uniform application between the time of application of the coating to the substrate and cure set time of the applied epoxy composition. The sand embedment will also increase tensile strength of the coating. Also, the degrees of non-skid can be controlled by the chemical make-up of the sand or similar filler used. The particle size can vary widely, generally a medium size being preferred, e.g. 90% of the particles pass through a 40-60 U.S. mesh screen.

Epoxy resins and curing agents are described in Applied Polymer Science by J.K. Craver and R.W. Tess, published by American Chemical Society (1975) pp 791-808, hereby incorporated by reference.

DETAILED DESCRIPTION OF THE DRAWINGS

The spray guns shown in FIGS. 1-4 are commercially available from Tri-Con, Inc. of Cleveland, Ohio.

Figure 1:
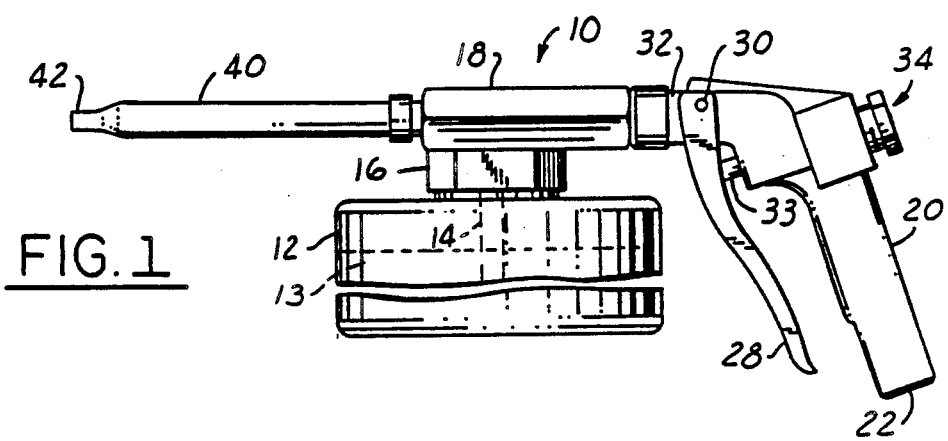
FIG. 1 is a side view of a spray gun from which the coating composition of the present invention may be sprayed.

The spray gun (10) of FIG. 1 is generally comprised of a container (12) in which the sprayable coating composition is placed and which includes the epoxy material and the hardener. The coating composition passes from the container (12) through the vacuum tube (14) which fits through the lid (16) to the container and through the body of the gun (18). Pressurized air flows from the handle of the gun (20) entering into the gun at inlet (22) which would then blow the coating composition (13) in the container (12) out of the body of the gun through the spray wand (40) which is threadably engaged (44) with the body (18). Flow of air is controlled by trigger (28) which is pivotally attached at point (30) on the upper portion (32) of the handle. A retainer cap (34) holds in place a spring and valve means (33) for controlling the air flow through the body of the handle.

Figure 3:
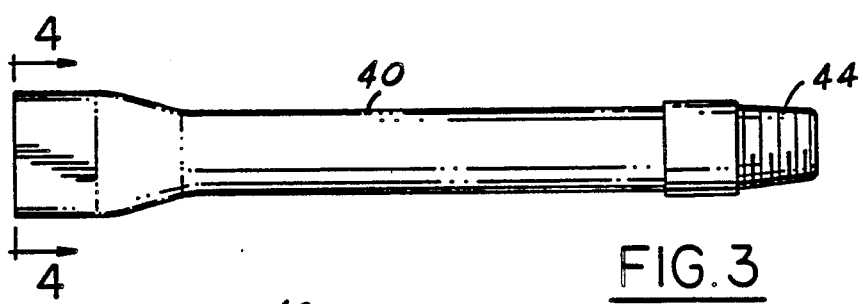
FIG. 3 is an expanded view of the spray nozzle of FIG. 1.
Figure 4:
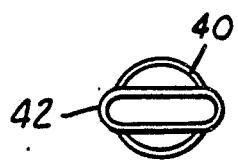
FIG. 4 is a front view of FIG. 3 taken along Lines 4—4.

The spray wand of FIG. 1 has a front tip portion (42). The spray wand is retained in place by threaded means (44) as shown in FIG. 3. The front portion of the spray wand of the gun of FIG. 1 is best shown in FIG. 4 where the outer periphery of the tip of the nozzle is depicted. It is to be appreciated that the nozzle of each of the guns can be modified to have an aperture opening consistent with the length of fiber that will be utilized in the coating composition. The diameter of the nozzle opening can vary widely but including at least 3/16" to at least ¼".

The gun of FIG. 2 is employed to spray the friction inducing particles, e.g., sand onto the applied coating. The gun operates similarly to that of FIG. 1 with the sand exiting the gun through nozzle (24) which is threadably engaged with tubular member (26).

The following are illustrations of the invention. All parts are parts by weight and all degrees are degrees Centigrade, unless otherwise indicated. In order to further clarify the present invention, the following examples are given for purposes of illustration.

EXAMPLE

An epoxy coating composition was formulated as follows. Listed below are the materials employed. In the first composition are the epoxy resins, they are listed as follows:

| Material | Amount (lbs.) |
| --- | --- |
| CMD 50735 | 688.1# |
| RD 18B 305 Blk. | 27.6# |
| Fiber Frax EF 121 | 32.2# |
| Hisol −10 | 111.8# |
| Dowanol PM | 111.8# |
| Cab-O-Sil TS 720 | 39.1# |
| Kelpoxy 293 | 229.0# |
| Total | 1239.6# (Containing 81.91% solids) |

A second Composition entailing the amine hardener was prepared having the following components:

| Material | Amount (lbs.) |
| --- | --- |
| Epicure 879 | 192.8# |
| Epicure 8799 | 64.0# |
| Ancamine 1895 | 171.4# |
| Ancamine K54 | 26.1# |
| Total | 454.3# |

Composition No. 1 has a weight of 8.56 lbs. (#) per gallon having a viscosity of 8400 cps (centipoise) at 20 rpm and 3400 cps at 100 rpm (Brookfield viscosity).

The second component has 8.22# per gallon and 1200 centipoise at 20 and 100 rpm.

The following procedure was followed for preparing components 1 and 2:

Component 1

1. Charge a clean, dry mixing tank with EpiRex 50735 and start the mixer at medium speed.
2. Add in RD 18B 305 Blk. and follow with Fiber Frax EF 121.
3. Make a premix slurry consisting of Hi Sol-10, Dowanol PM and Cab-O-Sil TS 720 before adding to the batch.
4. Add in Kelpoxy 293 and continue mixing for 1 hr. For easier handling, the Kelpoxy 293 may be stored in hot room to lower viscosity.

Component 2

1. Charge another clean, dry mixing vessel with Epi-Cure 879 and start mixer at low speed. Add in EpiCure 8799, Ancamine 1895 and Ancamine K54 in given order.
2. Mix for 30 minutes.

RD 18B 305 Blk. is a black pigment.

Hi Sol-10 is a trademark of Ashland Chemical for aromatic petroleum distillate CAS #64742-95-6.

Dowanol PM is a trademark of Dow Chemical Co. of Midland, Michigan for a mixture of 1 methoxy-2-propanol and 2-methoxy-1-propanol.

Cab-O-Sil TS 720 is a trademark of Cabot Corporation, Tuscola, Illinois for a hydrophobic fumed silica having a surface area of 80-120 square meters per gram, a density of less than 3.5 pounds per cubic foot, a moisture content at 105 Centigrade of less than 0.5, a carbon content of greater than 4.5.

EpiCure 879 is a trademark of Hi-Tek Polymers, Inc. of Louisville, Ky. for a modified aliphatic amine containing an aminoethyl piperazine in a nonyl phenol solvent.

Epicure 8799 is a trademark of Interez, Inc. for a modified aliphatic amine containing polyoxypropylene diamine in a nonyl phenol solvent.

CMD 50735 is a trademark of Interez, Inc. of Louisville, Ky. for epoxy.

Ancamine 1895 is a trademark of Pacific Anchor Chemical Corporation of Los Angeles, California for a cyclo aliphatic amine adduct (amine hydrogen equivalent weight equals 75).

Ancamine K54 is a trademark of Pacific Anchor Chemical Corporation of Los Angeles, Ca. for tris(-dimethylaminomethyl) phenol, a Lewis based catalyst acting as an activator or accelerator for other curing agents.

Components 1 and 2 were blended together at a ratio of 73.18 parts by weight (#1) to 26.82 parts by weight (#2) which is the preferred stoichiometric mix. The ratio, however, can be varied from 72.18 / 27.82 to 74.18 / 25.82 without compromising key performance properties.

The components were sprayed onto a truck bed. Curing occurred in the less than two hours with a final product (after two weeks) having Shore D hardness of 55 plus or minus 5 and a phase D hardness after 1 day of 18 plus or minus 1. The thickness of the cured material is preferred at 30–50 mils for a truck bed lining.

Other physical characteristics of the above coating when applied to a metal substrate are as follows:
Impact resistance (direct/reverse)—180/40 (ASTM 3281)
Tensile strength—approximately 10,000 psi (ASTM D1540)
Abrasion resistance—gravelometer—rating of 10 (ASTM D3170 at $-20°$ F.)
Chemical resistance The above coating was applied to a steel substrate and cured at room temperature to a thickness of 40 mils dry. After 4 weeks of exposure, there was no effect on exposure to hydrochloric acid, motor oil, transmission oil, ammonia hydroxide, antifreeze, caustic, ethanol and butyl Cellosolve (trademark of Union Carbide for ethylene glycol monobutyl ether). There was slight swelling on exposure to brake fluid, a slight etch on exposure to vinegar and an etching and discoloration on exposure to sulfuric acid.

The coating composition can be applied to various substrates for varying industrial and residential application. For example, the coating can be applied to a wood, a metal, and concrete substrate to become a flooring that is resistant to a chemical environment. Also, that composition can be applied to the interior of tank cars as a liner. Another lining application may be refuse vehicle liners where the corrosion resistance, impact resistance and tensile strength properties of the cured product can best be utilized.

The Brookfield viscosity of the coating composition can vary from 1500 centipoise (CPS) (pourable or sprayable) to 20,000 (pumpable) at 20 rpm. The high viscosity compositions can be applied to the substrate by brushing or troweling.

It is understood that the following claims are intended to cover all of the generic and specific features of the invention herein described and all statements of the scope of the invention which, as a matter of language, might be said to fall therebetween. It is understood that the terms used herein are merely descriptive rather than limiting, and that various changes may be made without departing from the spirit or scope of the invention.

For example, the pot life of the blended two component compositions can vary, preferably not greater than two hours, although it can be varied depending on epoxy resin and curing agents.

The level of ingredients inherent within the epoxy hardener composition can be varied to maximize a specific or combination of properties such as cure speed; increase or decrease potlife; increase or decrease shore hardness; chemical and solvent resistance; impact resistance; blush or carbonation resistance.

What is claimed is:

1. A method of forming a vehicle bed liner in situ comprising the steps:
   (a) providing an epoxy composition comprising a liquid epoxy resin, an effective reinforcing amount of a fiber, an elastomeric component, and an amine containing epoxy curing agent capable of curing the composition at room temperature to about 125° Fl;
   (b) applying the composition onto the vehicle bed; and
   (c) curing and forming the liner on the truck bed at room temperature to about 125° F. wherein the liner has a hardness on the Shore D scale.

2. The method of claim 1 wherein room temperature is at least 40° F.

3. The method of claim 1 wherein the number ratio of amine curing agent groups to epoxy groups ranges from about 0.9 to about 1.1 of the epoxy groups to amine groups.

4. The method of claim 1 wherein the epoxy amine group ratio is 1 to 1.

5. The method of claim 1 wherein the cured product has a Shore D hardness of about 20 to about 80.

6. The method of claim 1 which is a two component composition, the first containing epoxy material and the second containing the epoxy curing agent.

7. The method of claim 6 wherein the viscosity of the portion containing just the epoxy materials ranges from about 8000 to 12000 cps at 20 rpm.

8. The method of claim 1 wherein the fiber is used in an amount of 0.1 to 15% wt. of the total composition.

9. The method of claim 1 wherein the fiber has a diameter of less than 10 microns 10. The method of claim 1 wherein the fiber ranges in length from about 10 to about 200 microns.

11. The method of claim 1 wherein the amine curing agent is comprised of aliphatic and cycloaliphatic amines.

12. The method of claim 1 wherein the amine curing agent further characterized as containing a tertiary amine as a co-catalyst.

13. The method of claim 1 wherein the pot life of the mixed two component compositions ranges from about 5 minutes to about 3 hours.

14. The method of claim 1 wherein the epoxy and elastomeric portions are comprised of a single resinous material.

15. The method of claim 14 wherein the cured product has a thickness ranging from about 0.1 to 1.0 centimeter.

16. The product of the process of claim 15.

17. A method of forming a vehicle bed liner in situ comprising the steps:

(a) providing an epoxy composition comprising a liquid epoxy resin, an effective reinforcing amount of a fiber, an elastomeric component, and an amine containing epoxy curing agent capable of curing the composition at room temperature;
(b) applying the composition onto the vehicle bed; and
(c) curing and forming the liner on the truck bed at room temperature wherein the liner has a hardness on the Shore D scale.

18. The method of claim 17 wherein room temperature is as low as at least 40° F.

19. The method of claim 17 wherein the composition is sprayed onto the vehicle bed.

20. A method of forming a vehicle bed liner in situ comprising the steps:

(a) providing an epoxy composition comprising a liquid epoxy resin, an effective reinforcing amount of a fiber, an elastomeric component, and an amine containing epoxy curing agent capable of curing the composition at room temperature, wherein the curing agent contains both aliphatic and cycloaliphatic amines;
(b) applying the composition onto the vehicle bed; and
(c) curing and forming the liner on the truck bed at room temperature wherein the liner has a hardness on the Shore D scale.

21. The method of claim 20 wherein the epoxy and elastomeric portions are comprised of a single resinous material.

* * * * *

UNITED STATES PATENT AND TRADEMARK OFFICE
CERTIFICATE OF CORRECTION

PATENT NO. : 5,084,521
DATED : January 28, 1992
INVENTOR(S) : Roosevelt White

It is certified that error appears in the above-identified patent and that said Letters Patent is hereby corrected as shown below:

In Column 3, Line 48, delete the word "era" and insert therein the words --- or a ---.

In Column 7, Line 7, after the word "epoxy", insert therein the word --- resin ---.

In the Claims

In Claim 1, subsection (a), in Column 8, Line 23, delete "Fl" and insert therein "F".

Signed and Sealed this

Ninth Day of February, 1993

Attest:

STEPHEN G. KUNIN

Attesting Officer

Acting Commissioner of Patents and Trademarks